(12) United States Patent
Wright

(10) Patent No.: US 7,972,505 B2
(45) Date of Patent: Jul. 5, 2011

(54) PRIMARY EQUALIZATION SETTLING TANK

(75) Inventor: Terry Wright, Rochester, NY (US)

(73) Assignee: Trans Terra Corporation, Rochester, NY (US)

( * ) Notice: Subject to any disclaimer, the term of this patent is extended or adjusted under 35 U.S.C. 154(b) by 0 days.

(21) Appl. No.: 12/177,553

(22) Filed: Jul. 22, 2008

(65) Prior Publication Data

US 2010/0018929 A1    Jan. 28, 2010

(51) Int. Cl.
*C02F 1/00* (2006.01)
*B01D 21/00* (2006.01)
*B01D 21/24* (2006.01)
*B01D 21/30* (2006.01)

(52) U.S. Cl. ............... 210/170.08; 210/109; 210/137; 210/299; 210/313; 210/359; 210/411; 210/533; 210/534

(58) Field of Classification Search .............. 210/122, 210/170.08, 295, 299, DIG. 5, 242.1, 359, 210/776, 137
See application file for complete search history.

(56) References Cited

U.S. PATENT DOCUMENTS

| | | | |
|---|---|---|---|
| 4,405,458 A * | 9/1983 | McHugh, Jr. .......... 210/242.3 |
| 4,693,821 A * | 9/1987 | Goronszy et al. ........ 210/241 |
| 4,775,467 A | 10/1988 | Calltharp et al. |
| 4,891,128 A * | 1/1990 | Goronszy .......... 210/121 |
| 5,149,344 A | 9/1992 | Macy |
| 5,503,747 A * | 4/1996 | Vion et al. ............ 210/519 |
| 5,587,067 A * | 12/1996 | Love ................. 210/155 |
| 6,251,286 B1 * | 6/2001 | Gore ................. 210/744 |
| 6,915,818 B2 * | 7/2005 | Burris et al. ........ 137/544 |
| 7,311,818 B1 | 12/2007 | Gurfinkel |
| 2009/0236278 A1 * | 9/2009 | Hoefken ............. 210/237 |

FOREIGN PATENT DOCUMENTS

| | | |
|---|---|---|
| JP | 09276606 A | 10/1997 |
| KR | 100406908 B1 | 11/2003 |

* cited by examiner

*Primary Examiner* — Duane Smith
*Assistant Examiner* — Paul J Durand
(74) *Attorney, Agent, or Firm* — Harris Beach PLLC; Neal L. Slifkin

(57) ABSTRACT

Disclosed is a system for treating waste water. The system may be applied to any application for the treatment of waste water which benefits from an equalized flow into the waste water treatment processes, such as industrial batch discharges, storm water settling and screening, and septic receiving at a waste water treatment plant. The system comprises a single primary settling tank for the processes of grit removal, flow equalization, fine screening and primary clarification. The system further comprises the use of a flow measurement device on the discharge side of the primary settling tank to provide a uniform flow to downstream processes. The system further comprises placement of a fine screen on a discharge mechanism which controls the effluent flow from the primary settling tank.

31 Claims, 3 Drawing Sheets

PRIMARY EQUALIZATION SETTLING TANK

FIELD OF THE INVENTION

The invention relates generally to the field of waste water treatment and more specifically to a system for the treatment of waste water where the processes of grit removal, flow equalization, fine screening, flow measurement and primary clarification are performed using a single primary settling tank. The invention also relates to a system for the treatment of waste water where a flow measurement device is utilized on the discharge side of the tank to provide a uniform flow to further downstream processes.

BACKGROUND OF THE INVENTION

Waste water treatment systems used in the industry generally include, but are not limited to, the following treatment processes: grit removal, fine screening, flow equalization and primary clarification. The typical treatment processes are dependent on the velocity at which the waste water is moving through the system. Waste water, however, is not produced continually by humans, but instead is created in batch type processes, such as showering, flushing a toilet or operating a washing machine. Such water consumptive activities are generally repetitive resulting in daily, weekly, monthly and yearly diurnal flow patters for a specific waste water treatment system.

Grit removal is generally performed in a grit chamber which is velocity sensitive. The most common methods to remove grit are by reducing the velocity of the influent flow so that the grit settles out, or utilizing a circular channel/tank. The circular channel/tank is a hydro-cyclone that causes the grit to settle in a sump, separating the organics from the grit so that they can move forward to the biological processes. The grit is then pumped out of the sump to a grit washer and then discharged to a dumpster for disposal at a landfill. This technology is subject to a large variation in flows Fine screening is typically accomplished by placing a screen in an influent channel. The influent channel must have a minimum velocity of 1.25 feet per second to keep solids from settling out in the channel and a maximum velocity of 3.0 feet per second to keep solids from being forced through the screen. Such a flow is difficult to achieve due to the large variation in diurnal and pumped flow patterns.

Typical primary clarifiers are also velocity sensitive with the heavy solids going to the base of the clarifier where they are pumped to a digester, the floatable solids, grease and scum are trapped and skimmed off the surface and the neutral buoyant solids/clarified wastewater exits the basin via an effluent weir. Primary clarifiers are typically large tanks designed for gravity settling and may include electrical drives, flights and chains, rack arms and paddles or suction tubes and sludge pumps.

Flow equalization typically occurs in a separate tank. The flow at the waste water plant is subject to travel times in the collection system, collection system design and pump station sizing. In general, larger collection systems use pump stations to lift the waste water to the treatment facility. The pumps are typically placed on variable-frequency drives in an attempt to provide a consistent uniform flow. The system of variable-frequency drives and pumps, however, fails in low and high flow conditions. The pumps must be designed for peak hourly flows and have minimum turn down capabilities.

These treatments and processes generally each require their own mechanical equipment and supporting infrastructure resulting in higher capital costs to develop the system, increased maintenance and higher energy costs. Further, the necessary supporting infrastructure requires a large amount of space to develop a traditional waste water treatment system. Thus, there is a need to develop a waste water treatment system where the treatment processes are performed in a single tank, which uses less energy, requires fewer construction materials and takes up less space, while at the same time offering improved BOD reduction and a uniform flow to downstream processes.

SUMMARY OF THE INVENTION

The present invention provides a system for the treatment of waste water. The waste water treatment system comprises a single primary settling tank that performs grit removal, flow equalization, primary clarification and fine screening. An embodiment of the present invention also includes a flow measurement device located on the discharge side of the primary settling tank to measure the actual effluent flow from the primary settling tank. Further, an air blower may be provided to aerate the waste water in the primary settling tank to avoid the waste water becoming septic.

The waste water treatment system also includes at least one sludge withdrawal hopper, a scum trough, a fine screen and a discharge mechanism. In one embodiment, the discharge mechanism constitutes a driven decanter, which operates on a pivot and has a maximum height of one foot below the wall of the primary settling tank. The fine screen may be attached directly to the intake of the driven decanter. The height of the driven decanter is adjustable to match the actual effluent flow to a target flow. In one embodiment, the driven decanter further includes an actuated valve and a source of compressed air to pressurize the driven decanter to defoul the fine screen when the actuated valve is closed. In a further embodiment, the driven decanter further includes an actuated valve and a source of potable or non-potable water to backwash the fine screen when the actuated valve is closed.

In another embodiment of the present invention, the discharge mechanism is a floating decanter. The fine screen may be attached directly to the intake of the floating decanter. The floating decanter is attached to a discharge pipe by a flexible hose. The discharge pipe includes an actuated valve that is adjustable to match the actual effluent flow to a target flow. In one embodiment, the discharge pipe also includes a source of compressed air located prior to the actuated valve to pressurize the floating decanter to defoul the fine screen when the actuated valve is closed. In a further embodiment, the discharge pipe includes a source of potable or non-potable water located prior to the actuated valve to backwash the fine screen when the actuated valve is closed.

In a further embodiment of the present invention, the discharge mechanism is a fixed discharge pipe. The fine screen is mounted vertically around the discharge pipe.

The present invention also provides a method of treating waste water comprising performing grit removal, fine screening, flow equalization and primary clarification in a single primary settling tank. The method further comprises using a flow measurement device on the discharge side of the primary settling tank and adjusting a discharge mechanism in order to matching the actual effluent flow as measured by the flow measurement device to a target flow.

BRIEF DESCRIPTION OF THE DRAWINGS

The foregoing and other objects, features, and advantages of the invention will be apparent from the following more particular description of the embodiments of the invention.

DETAILED DESCRIPTION OF THE INVENTION

Figure 1:
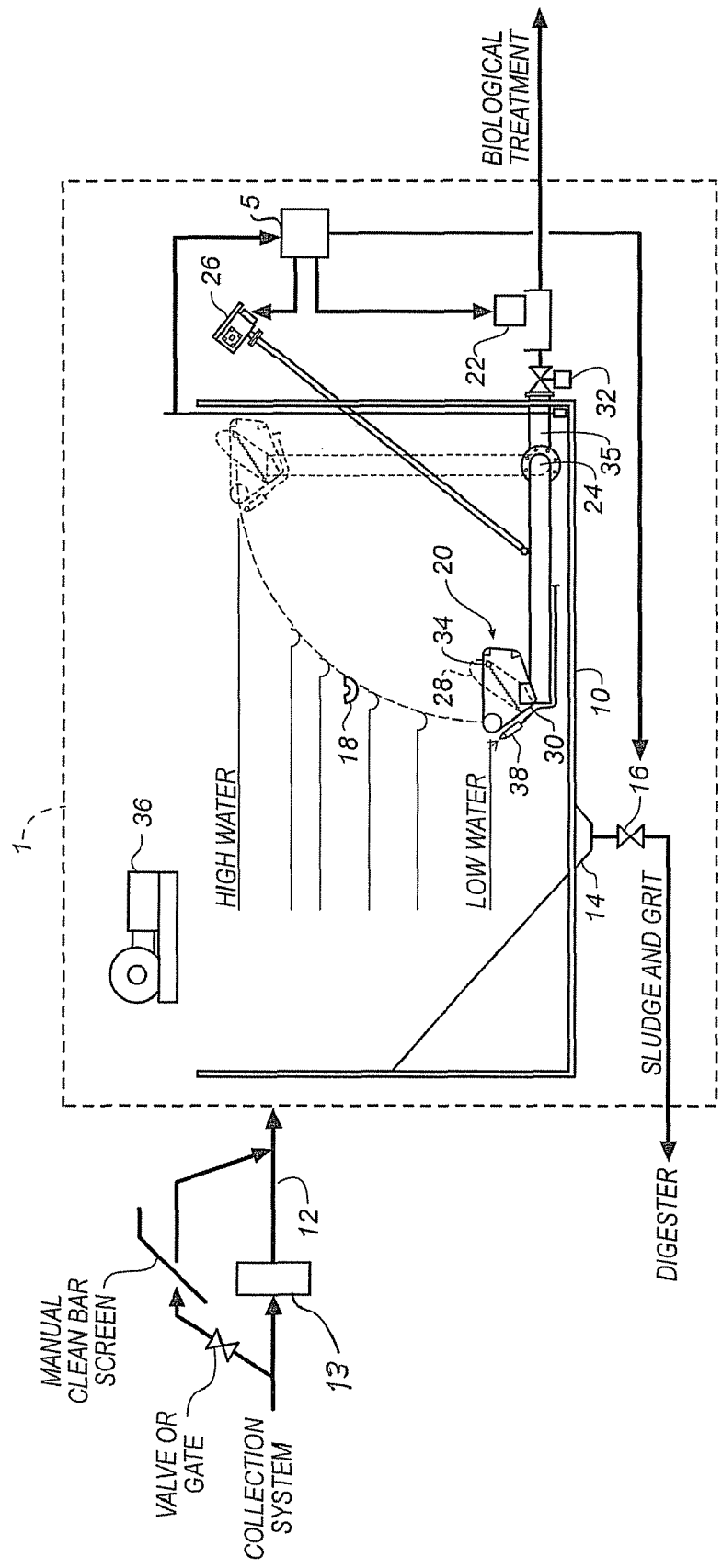
FIG. 1 is a schematic drawing of one embodiment of a waste water treatment system in accordance with the present invention.

The present invention is a system for the treatment of waste water. FIG. 1 is a schematic drawing of one embodiment of a waste water treatment system in accordance with the present invention. The waste water treatment system 1 comprises a single primary settling tank 10 which receives waste water from a waste water collection system through an influent channel 12. The waste water treatment system 1 may also be used in other applications that benefit from an equalized flow into the waste water treatment processes, such as industrial batch discharges and septic receiving at a waste water treatment plant. Waste water reaches the waste water treatment system 1 as a result of gravity, the operation of pumps, or both. A coarse bar rack or fine screen 13 may optionally be placed in the influent channel 12 to keep large inorganic solids from entering the waste water treatment system 1. Alternatively, a static or mechanical screen may be placed within the primary settling tank 10.

The primary settling tank 10 is sized based on the daily flow patterns for the collection system using generally known engineering practices. The size of the primary settling tank 10 is large compared to the influent channel 12 such that the velocity of the incoming flow decreases dramatically upon entrance of the water into the primary settling tank 10. The primary settling tank 10 is, however, shallow to provide for large surface overflow for improved settling and to maintain thinner side walls which decreases concrete costs.

The primary settling tank 10 is designed to have solids settle out in the tank based on the low velocity and the large cross-sectional area. At least one sludge hopper 14 is located at the bottom of the primary settling tank 10 to collect the settled sludge and grit. In further embodiments, multiple sludge hoppers may be used. The settled sludge and grit are removed from the sludge hopper 14 through a removal mechanism 16. The removal mechanism 16 may constitute either a draw off pipe with an actuated valve to remove the settled sludge and grit using gravity. Alternatively, the removal mechanism 16 may constitute sludge pumps or airlifts to transport the settled sludge and grit to a higher elevation or over a long distance. The settled sludge and grit are then transported to a digester and are subsequently sent to a landfill for disposal. The removal mechanism 16 is operated through a main control panel 5, which provides a signal to start and stop the removal mechanism 16. Sludge and grit is removed from the sludge hopper 14 regularly to keep the solids from becoming septic or becoming compacted. The solid content of the sludge and grit may also be maintained around 3-4%, although in some applications the solid content of the primary sludge may go as high as 10%. The primary settling tank 10 further includes a scum trough 18 which collects scum and grease. The position of the scum trough 18 may be determined by the equalization volume of the primary settling tank 12. The collected scum and grease are then pumped to a digester.

The waste water flows from the primary settling tank 10 through a discharge mechanism, which controls the effluent flow. In the embodiment shown in FIG. 1, the discharge mechanism is a driven decanter 20. In further embodiments, the discharge mechanism may also be a floating decanter and an actuated valve, or solely an actuated valve. A flow measurement device 22 is located on the discharge side of the primary settling tank 10 to measure the rate of the effluent flow. The flow measurement device 22 may be an electronic flow meter such as a mag meter (enclosed pipe), a parshall flume with an ultrasonic level sensor, a V-notched weir with an ultrasonic level sensor, a pressure transducer, or any other device capable of measuring the rate of the effluent flow. The flow measurement device 22 provides a signal to a main control panel 5. A target flow based on engineering design or operational experience is entered in the main control panel 5. The main control panel 5 controls the discharge mechanism, such as the driven decanter 20 in FIG. 1, to adjust the amount of water that is allowed to travel through the discharge mechanism to match the actual effluent flow as measured by the flow measurement device 22 to the target flow to maintain a uniform discharge flow from the primary settling tank 10 to downstream processes such as aeration tanks, secondary clarifiers, sand filters, disinfection and post aeration equipment.

The driven decanter 20 operates on a pivot 24 and is driven by a motor 26. The motor 26 may be a standard motor, a motor with an indexing drive, or a motor with a variable frequency drive to vary the rate of vertical movement of the driven decanter 20. The drive has reversing capabilities so that the driven decanter 20 can be raised or lowered in the primary settling tank 10. In one embodiment, the driven decanter 20 may be designed to have a maximum height of one foot below the wall of the primary settling tank 10 to provide an automatic overflow. The driven decanter 20 is controlled by the main control panel 5. A target flow based on engineering design or operational experience is entered in the main control panel 5. The flow measurement device 22 provides the main control panel 5 with the actual effluent flow from the primary settling tank 10. The main control panel 5 sends a signal to the motor 26 to raise and lower the decanter 20 to match the actual flow to the target flow. As the decanter 20 is lowered, a larger portion of the intake is submerged, increasing the actual flow. Conversely, as the decanter 20 is raised, a smaller portion of the intake is submerged, decreasing the actual flow.

A fine screen 28 is located at the intake of the driven decanter 20. In one embodiment, a floating baffle 30 may be used to keep grease and scum from fouling the fine screen 28. The effluent flow from the primary settling tank 10 must pass through the fine screen 28 prior to entering the downstream processes to provide a physical barrier to keep solids from entering the downstream processes. The fine screen 28 allows the primary settling tank 10 to be smaller in size because the fine screen 28 prevents neutrally buoyant solids from exiting the primary settling tank 10. Thus, the primary settling tank 10 does not have to be sized to create settling velocities low enough to remove those neutrally buoyant solids. The openings in the fine screen 28 may be approximately 0.2 mm to 5.0 mm to keep as much of the organic solids in the primary settling tank as possible without nuisance fouling, although additional opening sizes may be applicable for other applications.

Although the low velocities in the primary settling tank 10 should prevent significant fouling, the fine screen 28 may experience some fouling under certain circumstances. A cleaning system may be provided to remove fouling substances from the fine screen 28. The cleaning system may be automatically initiated by the main control panel 5 when the headloss through the fine screen 28 becomes too great, or may be set to occur at a regular interval.

In the embodiment shown in FIG. 1, as the bottom of the fine screen 28 fouls, the driven decanter 20 will be lowered to increase the flow rate to match the target flow. Prior to the entire fine screen 28 becoming fouled, a contact switch 34 will send a signal to the main control panel 5 to initiate the cleaning system. The cleaning system may constitute water jets which discharge from the inside of the driven decanter 20 outwards to displace the fouling substance. Alternatively, an actuated valve 32 may be located on the discharge pipe 35. The actuated valve 32 may be closed and compressed air, potable, or non-potable water may be forced into the discharge pipe 35 to force screened water back through the fine screen 28 to remove the fouling substance.

In a further embodiment, a water jet 38 runs along the length of the driven decanter 10. The water jet 38 has a small discharge opening 40 which allows for a low flow with high velocity. The water jet 38 creates a counter current to the flow through the fine screen 28. The counter current forces solids having surface area and low mass away from the fine screen 28, allowing liquid and particles of small surface area to pass through to the fine screen 28. The action of the water jet 38 will cause turbulence that will dislodge solids and reduce mating of solids on the surface of the fine screen 28. The water jet 38 reduces the number of necessary cycles of the cleaning system by decreasing the fouling of the fine screen 28.

In some instances, such as where there are long force mains and the waste water may become septic prior to reaching the waster water treatment system 1 it is advantageous to provide an aeration system 36 to aerate the waste water in the primary settling tank 10. In this application, aeration to the primary settling tank 10 would be cycled to allow solids to settle periodically. The fine screen 28 prevents the turbulence resulting from aeration from affecting the solids retention performance. The main control panel 5 would be integrated with activation of the air blower 36 based on water depth and sludge settling.

Figure 2:
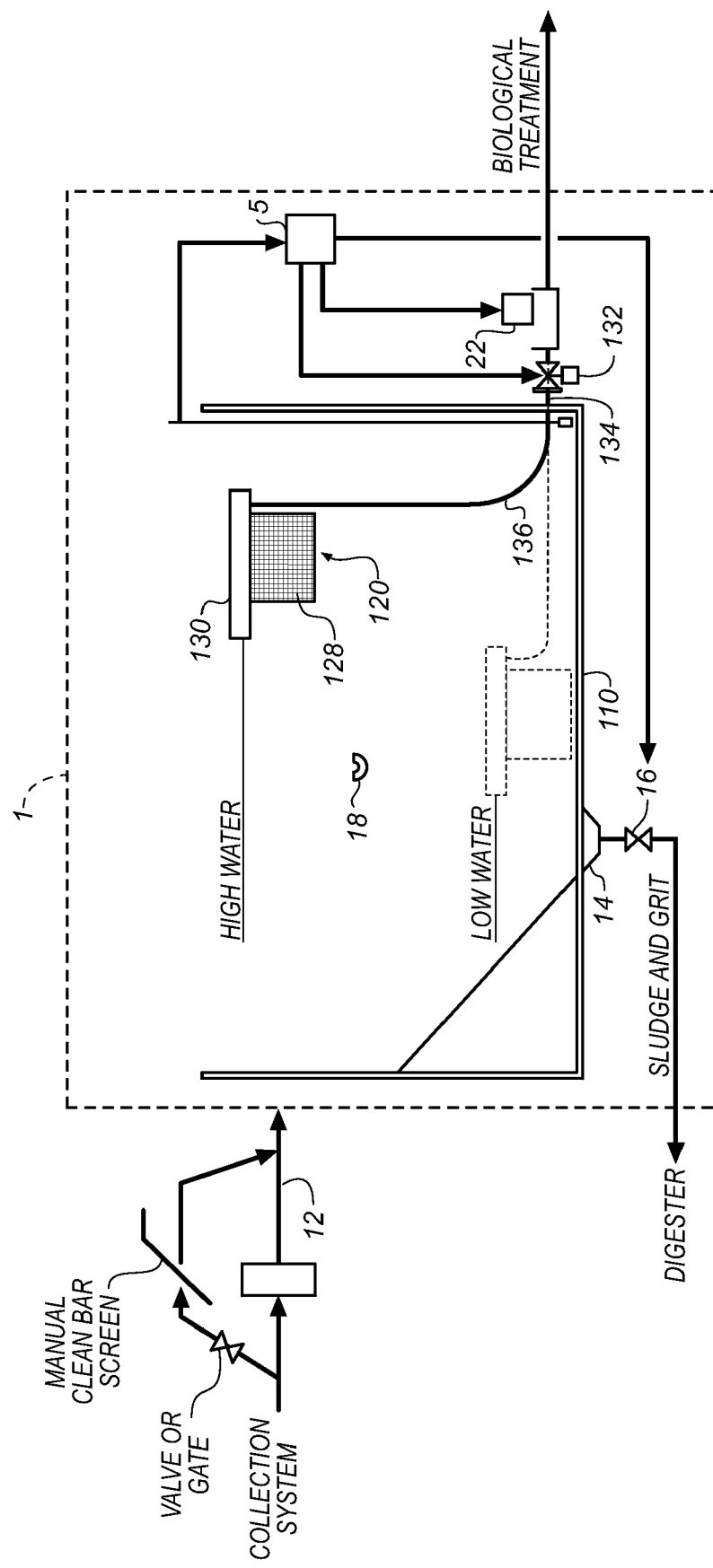
FIG. 2 is a schematic drawing of another embodiment of a waste water treatment system in accordance with the present invention.

FIG. 2 is a schematic drawing of another embodiment of a waste water treatment system in accordance with the present invention in which the discharge mechanism is a floating decanter 120. In this embodiment, the fine screen 128 is located on the intake of the floating decanter. In one embodiment, a floating baffle 130 is utilized to keep grease and scum from fouling the fine screen 128 and to support the floating decanter 120 on the surface of the water. The fine screen 128 is always submerged and rises and falls with the water level in the primary settling tank 110.

A flexible hose 136 connects the floating decanter 120 to the discharge pipe 134 which contains an actuated valve 132. In the preferred embodiment, the actuated valve 132 is a plug valve so as to prevent fouling and provide a wide range of flows. The actuated valve 132 is controlled by the main control panel 5. A target flow based on engineering design or operational experience is entered in the main control panel 5. The main control panel 5 sends a signal to actuated valve 132 to adjust the opening to match the actual flow to the target flow. In this embodiment, the fine screen 128 is cleaned by closing the actuated valve 132 located on the discharge pipe 134 and forcing compressed air into the discharge pipe 134 to force screened water back through the fine screen 128 to remove the fouling substance.

Figure 3:
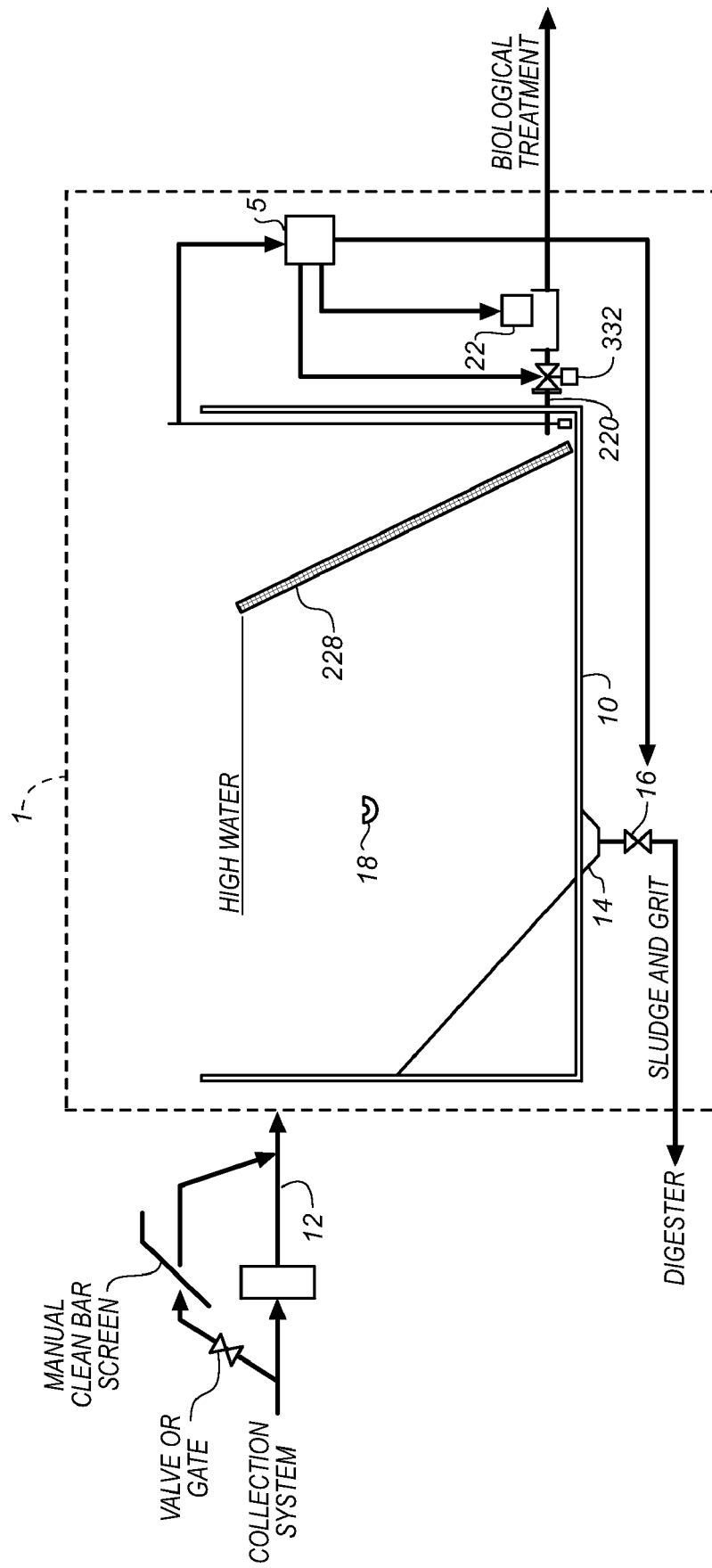
FIG. 3 is a schematic drawing of a further embodiment of a waste water treatment system in accordance with the present invention.

FIG. 3 is a schematic drawing of another embodiment of a waste water treatment system in accordance with the present invention. In this embodiment, the discharge mechanism is a fixed discharge pipe 220. The fine screen 228 is mounted vertically around the discharge pipe 220. The fine screen 228 can vary in diameter or surface area and must extend above the high water level and may be static or mechanical. In one embodiment, the fine screen 228 has a greater surface area as it rises up from the base. The discharge pipe 220 has an actuated valve 332. The rate at which water exits the primary settling tank 10 is controlled by the actuated valve 332.

What is claimed is:

1. A waste water treatment system comprising a single primary settling tank wherein processes of grit removal, sludge removal, flow equalization, primary clarification, and fine screening are carried out and wherein the settling tank has a waste water level which changes over time between a high level near the top of the primary settling tank and a low level near the bottom of the primary settling tank, and wherein the fine screening is carried out within the primary settling tank by a fine screen which moves in vertical location in response to the changes in water level and wherein the system includes a controller to control the flow rate through the system at water levels between the high level and the low level and wherein the grit and sludge are collected together in a common hopper and removed together.

2. The waste water treatment system of claim 1 wherein said single primary settling tank further comprises:
a discharge mechanism; and
a flow measurement device located on a discharge side of said primary settling tank.

3. The waste water treatment system of claim 2 further comprising at least one sludge withdrawal hopper.

4. The waste water treatment system of claim 2 further comprising a scum trough.

5. The waste water treatment system of claim 2 wherein said discharge mechanism includes a driven decanter.

6. The waste water treatment system of claim 5 wherein the fine screen is attached to said driven decanter.

7. The waste water treatment system of claim 6 wherein said driven decanter operates on a pivot.

8. The waste water treatment system of claim 7 wherein the maximum height of said driven decanter is one foot below top of the wall of said primary settling tank.

9. The waste water treatment system of claim 7 wherein the height of said driven decanter is moved between a first position in which a first portion of the fine screen is submerged in the waste water and a second position in which a second larger portion of the fine screen is submerged in the waste water to increase the rate of effluent flow.

10. The waste water treatment system of claim 5 wherein said driven decanter includes an actuated valve and a source of water to backwash said fine screen when said actuated valve is closed.

11. The waste water treatment system of claim 2 wherein an air blower provides aeration to said primary settling tank.

12. A waste water treatment system comprising a single primary settling tank wherein processes of grit removal, sludge removal flow equalization, primary clarification, and fine screening are carried out and wherein the settling tank has a waste water level which changes over time between a high level near the top of the primary settling tank and a low level near the bottom of the primary settling tank, and wherein the fine screening is carried out within the primary settling tank by a fine screen which moves in vertical location in response to the changes in water level and wherein the system includes a driven decanter to control the flow rate through the system at water levels between the high level and the low level and wherein the grit and sludge are collected together in a hopper and removed together.

13. The waste water treatment system of claim 12 wherein said single primary settling tank further comprises a flow measurement device located on a discharge side of said primary settling tank.

14. The waste water treatment system of claim 13 further comprising at least one sludge withdrawal hopper.

15. The waste water treatment system of claim 12 further comprising a scum trough.

16. The waste water treatment system of claim 15 wherein the fine screen is attached to said driven decanter.

17. The waste water treatment system of claim 16 wherein said driven decanter operates on a pivot.

18. The waste water treatment system of claim 17 wherein the maximum height of said driven decanter is one foot below top of the wall of said primary settling tank.

19. The waste water treatment system of claim 18 wherein the height of said driven decanter is moved between a first position in which a first portion of the fine screen is submerged in the waste water and a second position in which a second larger portion of the fine screen is submerged in the waste water to increase the rate of effluent flow.

20. The waste water treatment system of claim 12 wherein said driven decanter includes an actuated valve and a source of water to backwash said fine screen when said actuated valve is closed.

21. The waste water treatment system of claim 12 wherein an air blower provides aeration to said primary settling tank.

22. A waste water treatment system comprising:
a settling tank for receiving wastewater, said tank having an interior bounded by peripheral walls;
the interior having a waste water level which changes over time between a high level near the top of the settling tank and a low level nearer the bottom of the settling tank;
a flow measurement device coupled to a controller and a decanter, said decanter movable such that an entry point of a wastewater receiver of said decanter receives the wastewater at the high level and at the low level;
an exit of said interior connected to said wastewater receiver of said decanter, said exit located below said entry point of said receiver of said decanter when said decanter is at a lowest position of said decanter in said interior such that wastewater flows to said exit by gravity;
said decanter comprising a screen located between the wastewater in said interior and said receiver, said screen configured to finely screen the wastewater entering the receiver;
said controller configured to control movement of said decanter between said high level and said low level to control flow through said exit to provide flow equalization; and
said interior being undivided between said peripheral walls such that said decanter is in direct horizontal fluid communication with the waste water in said interior at a same vertical position as said decanter in the tank.

23. The waste water treatment system of claim 22 further comprising at least one sludge withdrawal hopper.

24. The waste water treatment system of claim 22 further comprising a scum trough.

25. The waste water treatment system of claim 22 wherein a the fine screen is attached to said driven decanter.

26. The waste water treatment system of claim 22 wherein said driven decanter operates on a pivot.

27. The waste water treatment system of claim 26 wherein the maximum height of said decanter is one foot below top of the Interior.

28. The waste water treatment system of claim 26 wherein the height of said decanter is moved between a first position in which a first portion of the fine screen is submerged in the waste water and a second position in which a second larger portion of the fine screen is submerged in the waste water to increase the rate of the flow through the exit.

29. The waste water treatment system of claim 22 wherein said decanter includes an actuated valve and a source of water to backwash said fine screen when said actuated valve is closed.

30. The waste water treatment system of claim 22 wherein an air blower provides aeration to said primary settling tank.

31. A waste water treatment system comprising:
a tank receiving wastewater, said tank having an interior bounded by peripheral walls;
a flow measurement device coupled to a controller and a decanter, said decanter vertically movable within said interior such that an entry point of a wastewater receiver of said decanter receives the wastewater at a desired vertical location to control an effluent flow of the wastewater flowing through an exit of said interior;
said flow measurement device located to measure the effluent flow of the wastewater flowing through said exit;
said exit of said interior connected to said wastewater receiver of said decanter, said exit located below said entry point of said receiver of said decanter when said decanter is at a lowest position of said decanter in said interior such that the effluent flow of the wastewater flows through said exit by gravity;
said controller configured to control the vertical movement of said decanter in said interior based on the effluent flow of the wastewater through said exit measured by said flow measurement device and based on a height of the wastewater in said interior to control the effluent flow through said exit to provide flow equalization; and
said interior being undivided between said peripheral walls such that said decanter is in direct horizontal fluid communication with the wastewater in said interior at a same vertical position as said decanter in said tank.

* * * * *